Patented Aug. 5, 1941

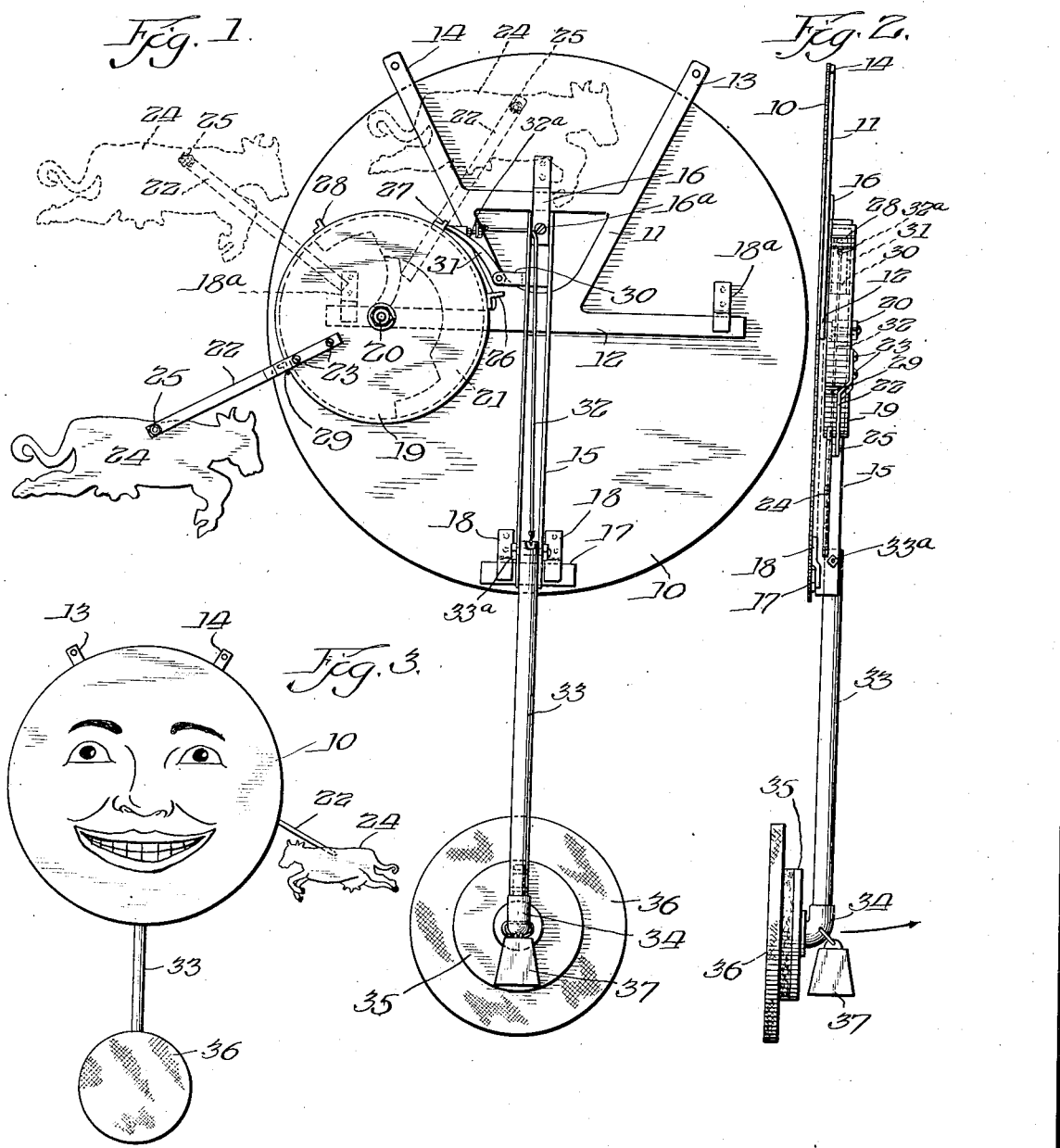

2,251,757

UNITED STATES PATENT OFFICE 2,251,757

AMUSEMENT DEVICE

John A. Rose, Palatine, Ill.

Application December 23, 1940, Serial No. 371,329

7 Claims. (Cl. 273—102.1)

My invention relates to an amusement device, and has particular reference to a device embodying mechanical means for carrying into effect a visual presentation of the Mother Goose story of the cow jumping over the moon.

Another object of my invention is the provision of a mechanical combination of parts which, upon being started in motion by a ball thrown against a target mounted on the tripping mechanism, causes a representation of a cow to pass up alongside of the outer periphery of a disc representing the moon and disappear behind the said disc at the upper periphery thereof, thereby completing the optical effect of the cow jumping over the moon.

Another and further object of my invention is the provision of an amusement device which can be utilized at fairs, bazaars and other places of amusement, in addition to being manufactured and sold as a mechanical toy for amusement purposes.

These and other objects of my invention will be more fully and better understood by reference to the accompanying sheet of drawings, and in which—

Figure 1 is a rear elevational view of my complete device;

Figure 2 is a side elevational view of the device shown in Figure 1; and

Figure 3 is a front elevational view shown in Figure 1 on a somewhat reduced scale.

Referring now specifically to the drawing, a round disc 10 of sheet metal or any other suitable material is shown, preferably having the representation of a face painted, embossed or otherwise impressed thereon, the front face of the disc being preferably colored yellow to more nearly simulate the moon in appearance. A frame 11 is shown of inverted A form, with a cross member 12 forming a part of the frame, and ends 13 and 14 extending beyond the periphery of the metal disc 10 and having holes in the ends thereof, which provides means for suspending the entire apparatus free of the floor at a suitable height necessary for the operation of the device, as will be more fully described hereinafter.

A channel 15 is provided which is secured to the frame 11 at its upper end by means of a fastening strap 16 riveted to the disc 10 at its upper end and passing over a part of the A frame and into the channel 15 to which it is secured by a screw 16ª. At its lower end the channel 15 is secured by a strap 17 having brackets 18, 18 secured to the rear face of the disc 10 with their ends overlapped over the strap 17, as shown particularly in Figure 1 of the drawing. Other brackets 18a, 18a are provided which are riveted to the back of the disc 10 and engage over the cross member 12 near the ends thereof, thereby holding the disc 10 in position on the frame.

A disc 19 is mounted upon one end of the transverse member 12 by means of a bolt 20, the disc having a peripheral counterweight 21 secured thereto at one side only and extending approximately three-quarters of the distance around the periphery of the disc 19. An arm 22 is secured to the rear face of the disc 19 by means of screws 23, on the end of which a figure 24, simulating a cow, is pivotally mounted by means of a bolt 25. Stops 26, 27, 28 and 29 are placed in spaced relation around the outer periphery of the disc 19, these stops limiting the rotation of the disc 19, as will be more fully described hereinafter in connection with the operation of the device.

A bracket 30 is mounted on the side of the channel iron 15 adjacent the disc 19, with a latch 31 pivotally mounted thereon. A cable 32 connected to the latch 31 by a rotatably mounted screw 32ª at one of its ends extends across through a hole in one of the side portions of the channel 15 and thence downward along the channel 15 where it is connected to the inner end of a swinging arm 33 pivotally mounted by means of a bolt 33ª to the lower end of the channel 15. The arm 33 has an angle 34 secured to its lower end in any approved manner, with a disc 35 as a target mounted thereon to the outer face of which a flexible disc 36 is secured, the disc 36 being made preferably of sponge rubber or any other suitable resistant material as may be desired. A bell 37 is secured to the angle 34 so that upon a ball or other object being thrown against the face of the disc 36 the bell rings. This bell is preferably in the form of an old-fashioned cow bell and adds to the effect and illusion of the operation of the device.

In operation of the device, it is preferably suspended from a frame a sufficient height above the floor so that the disc 36 is in substantial throwing alignment so that a light baseball may be thrown against the target 36. Upon the ball striking the face of the disc 36 within the area supported by the rear disc 35, the arm 33 swings back exerting a downward pull on the cord 32 and lifting the latch 31 above the stop 27, allowing the disc 19 to rotate in a clockwise direction, looking at the rear face of the device. The arm 33 automatically swings back into vertical position as shown in Figure 2, bringing the end of the latch down into engagement with the outer periphery of the disc 19 so that the disc only operates a short distance when the latch 31 engages against the stop 28, bringing the representation of the cow into the dotted line position shown in Figure 1, but outside of the line of the periphery of the disc.

The device remains in this position until the arm 33 is again swung back by a ball being thrown against the disc 36, when the latch 31 is released from the stop 28 and the disc further rotated to bring the representation of the cow behind the face of the disc, as shown in the dotted position of Figure 1. In this position the representation of the cow passes behind the disc 10, thus completing the illusion of the cow jumping over the moon.

It is then necessary for the operator to reset the apparatus by rotating the disc 19 in a counterclockwise direction until the representation of the cow is in the position shown in full lines in Figure 1. To prevent the operator from turning the disc too far, the stop 26 is provided which engages the end of the bracket 39, preventing the overturning of the disc 19. The counterweight 21 is positioned around the periphery of the disc 19 so that its tendency is to rotate the disc in a clockwise direction and is in balanced relation with respect to the arm 22 and the representation of the cow 24, so that when the device is turned into the position shown in Figure 1, it remains in stabilized position and is in position for the cycle of operations hereinabove described to be repeated.

The mechanism may be folded into fairly compact space for removal from place to place if desired, by the removal of the screw 16a, lifting the disc 10 upward so the members 16, 18 and 18a are free, and the arm 33 moved around its pivot point until it is folded against the angle 15. This movement of the arm 33 will move the latch 31 free of all of the stops on the disc 19 so that the counterweight will automatically cause the disc 19 to rotate so the counterweight is at the bottom of the disc, thereby moving the arm 22 and the representation of the cow up adjacent the legs 13 and 14 of the frame. In this manner the whole apparatus can be packed closely and again set up in a new location if desired.

The cable 32 may be adjusted to either a taut or loose condition, as may be desired, by the screw 32a threaded into the latch 31. If the cable 32 is taut or is adjusted so that the latch engages only the edge of the stops, such as 27 or 28, then a very slight movement of the target will release the disc 19, as when struck by a ball thrown lightly, whereas if the cable is loose the target must be moved a considerable distance as by a ball thrown with a great deal of force. Therefore to compensate for variation in force, I provide an adjustment of the cable 32.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

What is claimed is:

1. An amusement device comprising, in combination, a frame, a disc mounted thereon representing the moon, a second disc rotatably mounted on said frame, means whereby said second disc is rotated, an arm on said second mentioned disc, a figure on said arm representing a cow, a pivotally mounted tripping arm, a target on said tripping arm, and connecting means between said tripping arm and the said latch.

2. An amusement device comprising, in combination, a frame, a disc mounted thereon representing the moon, a second disc rotatably mounted on said frame, a counterweight on said second mentioned disc, an arm on said second mentioned disc, a figure on said arm representing a cow, a pivotally mounted tripping arm, a target on said tripping arm, and connecting means between said tripping arm and the said latch.

3. An amusement device comprising, in combination, a frame, a disc mounted thereon representing the moon, a second disc rotatably mounted on said frame, a peripheral counterweight on said second mentioned disc, an arm on said second mentioned disc, a figure on said arm representing a cow, a pivotally mounted tripping arm, a target on said tripping arm, and connecting means between said tripping arm and the said latch.

4. An amusement device comprising, in combination, a frame, a disc mounted thereon representing the moon, a second disc rotatably mounted on said frame, a peripheral counterweight on said second mentioned disc extending substantially around three-quarters of the periphery of the said disc, an arm on said second mentioned disc, a figure on said arm representing a cow, a pivotally mounted tripping arm, a target on said tripping arm, and connecting means between said tripping arm and the said latch.

5. An amusement device comprising, in combination, a frame, a representation of the moon mounted thereon, a rotatably mounted disc on said frame counterbalanced at one of its sides whereby the said disc tends to rotate when the counterbalanced side is at any other point than the lowermost one, a representation of a cow secured to said disc on the side opposite the counterbalance, a swinging target, and operative connections between said target and the rotatably mounted disc whereby when the target is actuated the rotatably mounted disc is released thereby moving the representation of the cow within the periphery of the representation of the moon.

6. An amusement device comprising, in combination, a frame, a representation of the moon mounted thereon, a rotatably mounted disc on said frame counterbalanced at one of its sides whereby the said disc tends to rotate when the counterbalanced side is at any other point than the lowermost one, a representation of a cow secured to said disc on the side opposite the counterbalance, a plurality of spaced stops on the periphery of the rotatably mounted target, a pivotal latch, a swinging target, and a connection between the said target and the latch whereby upon the target being actuated the latch is moved to release the rotatably mounted disc.

7. An amusement device comprising, in combination, a frame, a representation of the moon mounted thereon, a rotatably mounted disc on said frame counterbalanced at one of its sides, whereby the said disc tends to rotate when the counterbalanced side is at any other point than the lowermost one, a representation of a cow secured to said disc on the side opposite the counterbalance, a plurality of spaced stops on the periphery of the rotatably mounted target, one of said stops being adapted to prevent reverse rotation of said rotatably mounted disc beyond a predetermined point, a pivotal latch, a swinging target, and a connection between the said target and the latch whereby upon the target being actuated the latch is moved to release the rotatably mounted disc.

JOHN A. ROSE.